July 14, 1925.
C. R. LARSSON
1,546,288
SHAVING BRUSH
Filed April 30, 1924
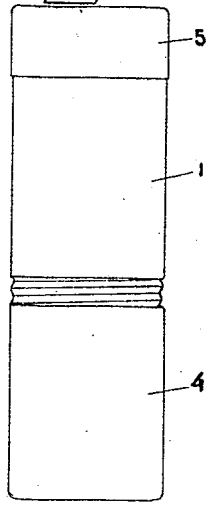
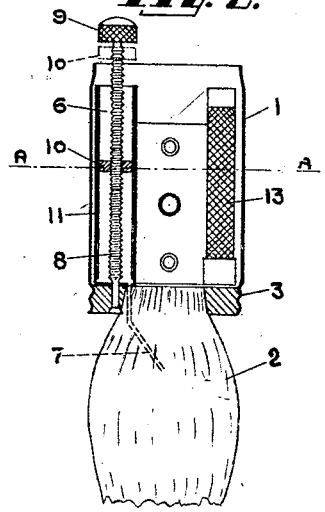
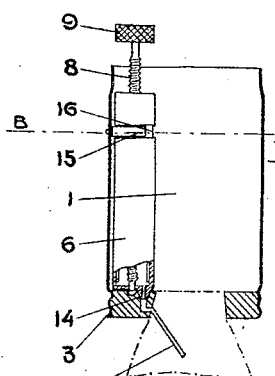
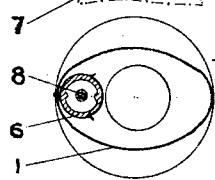
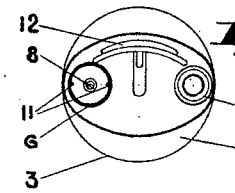
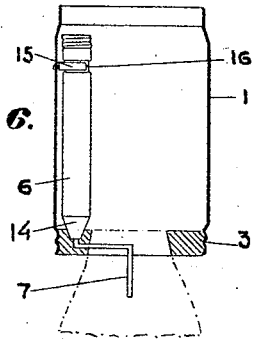
Inventor.
Carl Richard Larsson.
by
W. C. Linton
Atty.

Patented July 14, 1925.

1,546,288

UNITED STATES PATENT OFFICE.

CARL RICHARD LARSSON, OF GETINGE, SWEDEN.

SHAVING BRUSH.

Application filed April 30, 1924. Serial No. 710,101.

*To all whom it may concern:*

Be it known that I, CARL R. LARSSON, a subject of the King of Sweden, residing at Getinge, county of Halland, and Kingdom of Sweden, have invented certain new and useful Improvements in Shaving Brushes; and I do hereby declare that the following is a full, clear, concise, and exact description of the invention, such as will enable others skilled in the art to which it appertains to make and use the same.

The present invention relates to shaving-brushes and has for its principal object to provide the brush with means which will facilitate the lathering procedure.

A further object of the invention is to provide the handle of the brush in such a manner that the same will be able to contain within a reduced space the means necessary for shaving.

Other objects of the invention will be made clear by the following description with reference to the accompanying drawing.

Referring now to the drawing, illustrating some embodiments of the invention, Figure 1 shows a side elevation of the brush, the bristle portion of which being enclosed by a cover. Figure 2 is a similar view showing the brush with the said cover removed and the handle of the brush in longitudinal section. Figure 3 is a cross-section of the handle on the line A—A in Figure 2. Figure 4 is a longitudinal section of the handle of the brush arranged according to a second embodiment of the invention. Figure 5 is a section on the line B—B in Figure 4. Figure 6 is a view corresponding to Figure 4 and showing a third embodiment of the invention.

With reference to Figures 1-3 in the drawing, 1 denotes the handle of the brush and 2 the bristle portion thereof, which is fastened to an annular plate 3 externally provided with threads in order to enable the application of a cover 4 (Figure 1) about the bristle portion 2. The hollow or socket-shaped handle 1 may be closed by a cover 5 and has preferably an oval cross-section (Figure 3) in order that the brush easily may be manipulated and taken in the pocket. According to the invention there is within this handle arranged a tubular or otherwise shaped receptacle 6 for liquid or half-liquid soap from the bottom of which there extends a pipe or flexible tube 7 into the bristle portion 2. The receptacle 6 is by its one end fastened to the plate 3, to which there is also fastened a rotatable screw 8 passing centrally through the receptacle and in its outer end provided with a knob or handle 9 for the rotation of the screw. The length of the screw 8 is accommodated in such a manner that it does not prevent the application of the cover 5 upon the handle 1. By means of this screw there is in the receptacle 6 movable a plate 10 serving as a piston and, when the receptacle is of cylindrical shape as shown in the drawing, prevented from rotation by guide-lists 11 arranged on the inside of the receptacle.

In Figures 2 and 3 there is shown a shaving-apparatus 12 of the well-known kind with the removable handle 13 inserted into the handle 1 of the brush, so that the latter contains all means necessary for shaving.

In the use the covers 4 and 5 are removed whereupon the shaving-apparatus is taken out from the handle 1. By rotating the screw 8 the liquid or half-liquid soap being within the receptacle is pressed through the pipe or tube 7 into the bristle portion 2.

When filling the receptacle with soap the piston 10 is screwed up so far that it is located outside the outer end of the receptacle as shown by dotted-and-dashed lines in Figure 2. In this position of the piston the soap can be supplied into the receptacle.

The embodiment according to Figures 4 and 5 differs from that one described substantially thereby that the lower end of the receptacle 6 is provided with a nozzle 14 projecting into a corresponding recess in the plate 3, the said recess communicating with the pipe or tube 7. The receptacle is removably fastened to the handle of the brush by means of a resilient guard-shaped member 15 attached to the inside of the handle. The shanks of this guard are fitted in a groove 16 extending all round the receptacle which by this means easily can be removed from the handle 1 by spacing the shanks of the guard slightly apart.

In the embodiment shown in Figure 6 the screw 8 and the piston 10 are dispensed with. The receptacle 6 is made of such a material as permits the soap to be pressed out into the pipe or tube 7 by a lateral pressure upon the receptacle. The lower end of the latter is formed with a conical nozzle 14 which extends into a corresponding recess in the plate 3 and communicates with the pipe or tube 7. Also in this embodiment the receptacle 6 is removably fastened to the handle 1 by a guard 15 co-operating with a groove 16 in the receptacle.

I do not limit my invention to the embodiments above described and shown in the drawing but want to vary the details thereof without departing from the spirit of the invention. For instance the receptacle also may have a rectangular or other non-round cross-section, in which case special guides for the piston, if it is employed, may be dispensed with.

What I claim is:—

1. A shaving brush comprising in combination a tubular handle forming a chamber therein, a bristle portion formed with one end thereof, a soap containing receptacle positioned excentrically within the chamber of said handle, means for supplying the soap from said receptacle to said bristle portion, said receptacle being substantially the same length as that of said chamber and of small cross sectional area in relation to the cross section area of said handle chamber whereby a shaving device may be placed within said chamber.

2. A shaving brush comprising in combination a tubular handle forming a storage chamber therein, an annular plate secured within one end of said handle, a bristle portion secured within said plate, a soap containing receptacle positioned within said chamber, means for connecting the lower end of said receptacle to said plate, soap conveying means arranged between said receptacle and said bristle portion, and covers detachably connected to the opposite ends of said handle.

3. A fountain shaving brush comprising a tubular handle forming a chamber therein, an annular plate received within one end thereof, a bristle portion carried by said plate, a soap containing receptacle, a nozzle formed with one end of said receptacle, and adapted to be seated within a recess formed within said plate, and means for supplying soap from said nozzle to said bristle portion.

4. In shaving brushes, the combination with a hollow handle of the brush, of a receptacle adapted to contain soap, means for supplying the soap from said receptacle into the bristle portion of the brush, said receptacle being positioned excentrically within said handle and having small cross sectional area in relation to the cross sectional area of the handle so as to leave a comparatively large free space within the handle adapted to receive a shaving apparatus, means for detachably fastening the receptacle to the handle, said fastening means comprising a guard secured to the inner side of the handle having shanks adapted to engage a groove on the outer side of said receptacle.

In witness whereof I have hereunto set my hand.

CARL RICHARD LARSSON.